US010474496B1

(12) United States Patent
Kamran et al.

(10) Patent No.: US 10,474,496 B1
(45) Date of Patent: Nov. 12, 2019

(54) DYNAMIC MULTITASKING FOR DISTRIBUTED STORAGE SYSTEMS BY DETECTING EVENTS FOR TRIGGERING A CONTEXT SWITCH

(71) Applicant: EMC IP Holding Company LLC, Hopkinton, MA (US)

(72) Inventors: Lior Kamran, Rishon LeZion (IL); Amitai Alkalay, Kadima (IL); Zvi Schneider, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/162,471

(22) Filed: Oct. 17, 2018

(51) Int. Cl.
| G06F 3/00 | (2006.01) |
| G06F 9/48 | (2006.01) |
| G06F 3/06 | (2006.01) |
| G06F 13/40 | (2006.01) |
| G06F 9/54 | (2006.01) |
| G06F 9/52 | (2006.01) |
| G06F 13/362 | (2006.01) |

(52) U.S. Cl.
CPC ............ *G06F 9/4881* (2013.01); *G06F 3/061* (2013.01); *G06F 3/067* (2013.01); *G06F 3/0659* (2013.01); *G06F 9/522* (2013.01); *G06F 9/542* (2013.01); *G06F 13/362* (2013.01); *G06F 13/4022* (2013.01)

(58) Field of Classification Search
CPC ............................ G06F 9/4881; G06F 3/0659
See application file for complete search history.

(56) References Cited

U.S. PATENT DOCUMENTS 10,140,053 B1* 11/2018 Ayzenberg .............. G06F 15/76
2017/0235652 A1* 8/2017 Natanzon ............ G06F 11/1453
714/6.3

* cited by examiner

*Primary Examiner* — Tammara R Peyton
(74) *Attorney, Agent, or Firm* — Daly, Crowley, Mofford & Durkee, LLP

(57) ABSTRACT

A method is disclosed for dynamic multitasking in a storage system, the storage system including a first storage server configured to execute a first I/O service process and one or more second storage servers, the method comprising: detecting a first event for triggering a context switch; transmitting to each of the second storage servers an instruction to stop transmitting internal I/O requests to the first I/O service process, the instruction including an identifier corresponding to the first I/O service process, the identifier being arranged to distinguish the first I/O service process from other first I/O service processes that are executed by the first storage server concurrently with the first I/O service process; deactivating the first I/O service process by pausing a frontend of the first I/O service process, and pausing one or more I/O providers of the first I/O service process; and executing a first context switch between the first I/O service process and a second process.

20 Claims, 10 Drawing Sheets

US 10,474,496 B1

DYNAMIC MULTITASKING FOR DISTRIBUTED STORAGE SYSTEMS BY DETECTING EVENTS FOR TRIGGERING A CONTEXT SWITCH

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method for dynamic multitasking in a storage system, the storage system including a first storage server configured to execute an first I/O service process and one or more second storage servers, the method comprising: detecting a first event for triggering a context switch; transmitting to each of the second storage servers an instruction to stop transmitting internal I/O requests to the first I/O service process, the instruction including an identifier corresponding to the first I/O service process, the identifier being arranged to distinguish the first I/O service process from other first I/O service processes that are executed by the first storage server concurrently with the first I/O service process; deactivating the first I/O service process by pausing a frontend of the first I/O service process, and pausing one or more I/O providers of the first I/O service process; and after the first I/O service process is deactivated, executing a first context switch between the first I/O service process and a second process, the first I/O service process and the second process being executed on a same processor core of the first storage server, and the first context switch causing the processor core to stop executing the first I/O service process and begin executing the second process.

According to aspects of the disclosure, an apparatus for use in a storage system, the storage system including a first storage server configured to execute an first I/O service process and one or more second storage servers, the apparatus comprising: a memory; and at least one processor operatively coupled to the memory, the at least one processor being configured to: detect a first event for triggering a context switch; transmit to each of the second storage servers an instruction to stop transmitting internal I/O requests to the first I/O service process, the instruction including an identifier corresponding to the first I/O service process, the identifier being arranged to distinguish the first I/O service process from other first I/O service processes that are executed by the first storage server concurrently with the first I/O service process; deactivate the first I/O service process by pausing a frontend of the first I/O service process, and pausing one or more I/O providers of the first I/O service process; and after the first I/O service process is deactivated, execute a first context switch between the first I/O service process and a second process, the first I/O service process and the second process being executed on a same processor core of the first storage server, and the first context switch causing the processor core to stop executing the first I/O service process and begin executing the second process.

According to aspects of the disclosure, a non-transitory computer-readable medium storing one or more processor-executable instructions, which when executed by at least one processor cause the at least one processor to execute the operations of: detecting a first event for triggering a context switch in a first storage server, the first server being configured to execute an first I/O service process for servicing I/O requests in a distributed storage system; transmitting to each of a plurality of second storage servers that are part of the distributed storage system an instruction to stop transmitting internal I/O requests to the first I/O service process, the instruction including an identifier corresponding to the first I/O service process, the identifier being arranged to distinguish the first I/O service process from other first I/O service processes that are executed by the first storage server concurrently with the first I/O service process; deactivating the first I/O service process by pausing a frontend of the first I/O service process, and pausing one or more I/O providers of the first I/O service process; and after the first I/O service process is deactivated, executing a first context switch between the first I/O service process and a second process, the first I/O service process and the second process being executed on a same processor core of the first storage server, and the first context switch causing the processor core to stop executing the first I/O service process and begin executing the second process.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
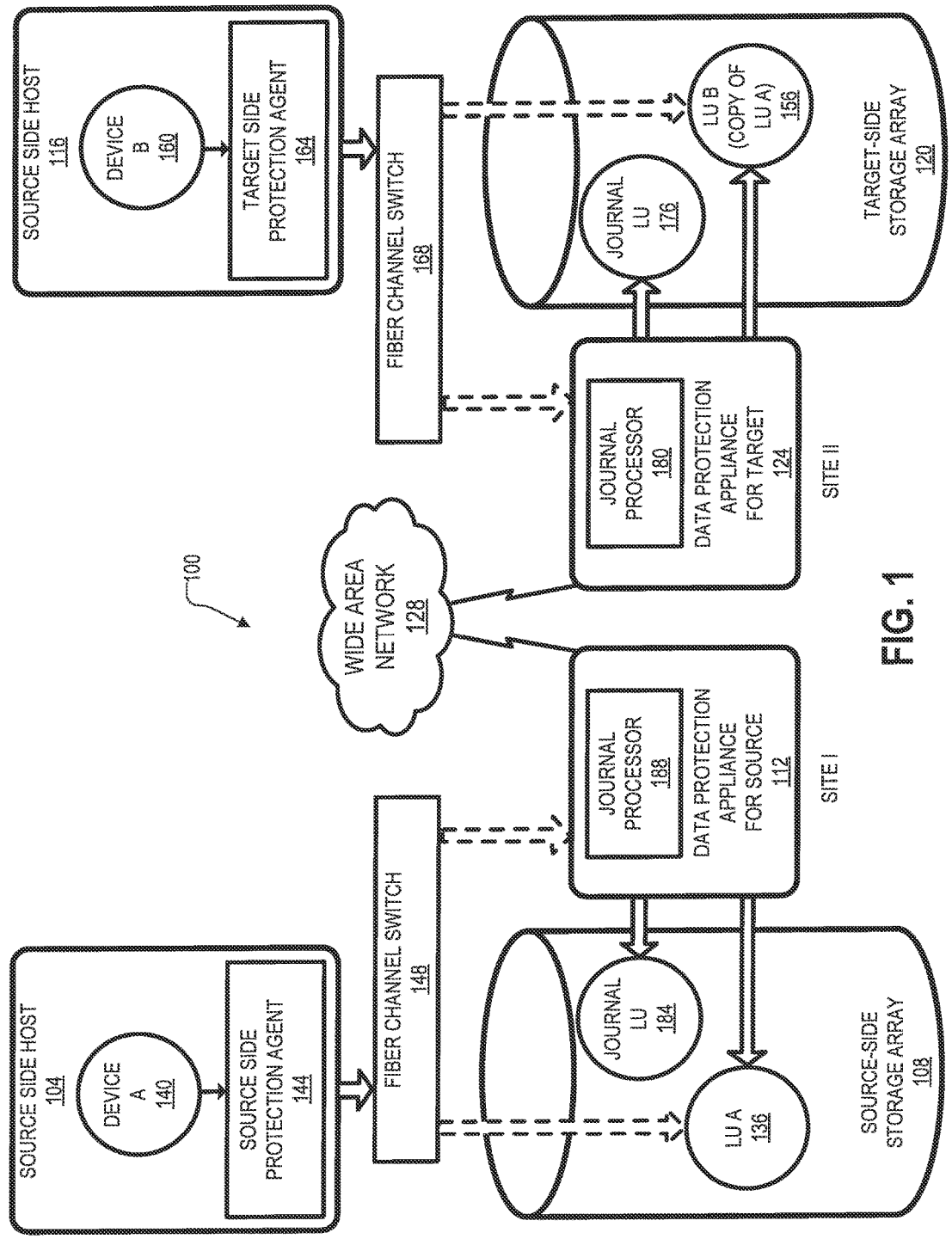
FIG. 1 is a diagram of an example of a distributed storage system, according to aspects of the disclosure.

Referring to the embodiment of FIG. 1, a data protection system 100 includes two sites: Site I 100a and Site II 100b. Under normal operation Site I 100a may correspond to a source side (i.e., the transmitter within a data replication workflow) of system 100 and Site II 100b may be the target side (i.e., the receiver within a data replication workflow) of the system, as shown in FIG. 1. Thus, during normal operations, the direction of replicate data flow may go from Site I 100a to Site II 100b.

In certain embodiments, Site I and Site II may be remote from one another. In other embodiments, the two sites may be local to one another. In particular embodiments, Site I and Site II may be connected via a local area network (LAN). In other embodiments, the two sites may be connected via a wide area network (WAN) 128, such as the Internet.

In particular embodiments, the data protection system may include a failover mode of operation, wherein the direction of replicated data flow is reversed. In such embodiments, Site I may behave as a target side and Site II may behave as the source side. In some embodiments, failover may be triggered manually (e.g., by a user) or automatically. In many embodiments, failover may be performed in the event of a disaster at Site I. In some embodiments, both Site I and Site II may behave as source side for some stored data and may behave simultaneously as a target site for other stored data. In certain embodiments, a portion of stored data may be replicated from one site to the other, and another portion may not be replicated.

In some embodiments, Site I corresponds to a production site (e.g., a facility where one or more hosts run data processing applications that write data to a storage system and read data from the storage system) and Site II corresponds to a backup or replica site (e.g., a facility where replicated production site data is stored). In such embodiments, Site II may be responsible for replicating production site data and may enable rollback of Site I data to an earlier point in time. In many embodiments, rollback may be used in the event of data corruption of a disaster, or alternatively in order to view or to access data from an earlier point in time.

Referring again to FIG. 1, Site I 100a includes a source host 104, a source storage system (or "storage array") 108, and a source data protection appliance (DPA) 112 coupled via a first storage area network (SAN). Similarly, Site II 100b includes a target host 116, a target storage system 120, and a target DPA 124 coupled via a second SAN. Each SAN may include one or more devices (or "nodes") that may be designated an "initiator," a "target", or both. In the embodiment of FIG. 1, the first SAN includes a first fiber channel switch 148 and the second SAN includes a second fiber channel switch 168. Communication links between each host 104, 116 and its corresponding storage system 108, 120 may be any appropriate medium suitable for data transfer, such as fiber communication channel links. In many embodiments, a host communicates with its corresponding storage system using SCSI commands.

Referring back to FIG. 1, hosts 104 and 116 may each correspond to one computer, a plurality of computers, or a network of distributed computers. In some embodiments, a host may include a processor, volatile memory, non-volatile memory, a data bus, an I/O interface, a display interface and a network interface. In certain embodiments, a host may run at least one data processing application, such as a database application and an e-mail server.

Referring again to FIG. 1, each storage system 108, 120 may include storage devices for storing data, such as disks or arrays of disks. In some embodiments, the storage systems may be target nodes. In certain embodiments, in order to enable initiators to send requests to a storage system, the storage system may expose one or more logical units (LU) to which commands are issued. In many embodiments, the storage systems may be SAN entities that provide multiple LUs for access by multiple SAN initiators. In many embodiments, an LU is a physical or virtual logical entity provided by a storage system for accessing data stored therein. In some embodiments, an LU may be a virtual disk accessed by a virtual machine. In certain embodiments, an LU may be identified by a unique logical unit number (LUN).

In the embodiment of FIG. 1, storage system 108 exposes a logical unit 136, designated as LU A, and storage system 120 exposes a logical unit 136, designated as LU B. LU B may be used for replicating LU A. As such, LU B may be generated as a copy of LU A. In one embodiment, LU B may be configured so that its size is identical to the size of LU A.

Referring back to FIG. 1, the source host 104 generates a host device 140 ("Device A") corresponding to LU A and the source host 116 generates a host device 160 ("Device B") corresponding to LU B. In many embodiments, a host device is a logical entity within a host through which the host may access an LU. In some embodiments, an operating system of a host may generate a host device for each logical unit exposed by a storage system in the host SAN.

Referring again to FIG. 1, the source host 104 is configured to act as a SAN initiator that issues I/O requests through host device 140 to LU 156 ("LU A"). In some embodiments, the I/O requests include SCSI commands. In many embodiments, an I/O request includes an address that includes a specific device identifier, an offset within the device, and a data size.

Referring back to FIG. 1, the source DPA 112 and target DPA 124 may perform various data protection services, such as data replication of a storage system, and journaling of I/O requests issued by the hosts 104, 116. When acting as a target DPA, a DPA may also enable rollback of data to an earlier point-in-time (PIT), and processing of rolled back data at the target site. Each DPA 112, 124 may be a physical device, a virtual device running, or may be a combination of a virtual and physical device.

In some embodiments, a DPA may be a cluster of such computers. In many embodiments, a cluster may ensure that if a DPA computer is down, then the DPA functionality switches over to another computer. In some embodiments, computers within a DPA cluster may communicate with one another using at least one communication link suitable for data transfer via fiber channel or IP based protocols, or such other transfer protocol. In certain embodiments, one computer from the DPA cluster may serve as the DPA leader that coordinates other computers in the cluster, and may also perform other tasks that require coordination between the computers, such as load balancing.

In certain embodiments, a DPA may be a standalone device integrated within a SAN. In other embodiments, a DPA may be integrated into a storage system. In some embodiments, the DPAs communicate with their respective hosts through communication lines such as fiber channels using, for example, SCSI commands or any other protocol.

In various embodiments, the DPAs may be configured to act as initiators in the SAN. For example, the DPAs may issue I/O requests using to access LUs on their respective storage systems. In some embodiments, each DPA may also be configured with the necessary functionality to act as targets, e.g., to reply to I/O requests, such as SCSI commands, issued by other initiators in the SAN, including their respective hosts. In certain embodiments, the DPAs, acting as target nodes, may dynamically expose or remove one or more LUs.

Referring again to FIG. 1, as described herein above, Site I and Site II may each behave simultaneously as a production site and a backup site for different logical units. As such, DPA 112 and DPA 124 may each behave as a source DPA for some LUs, and as a target DPA for other LUs, at the same time.

In the embodiment of FIG. 1, hosts 104 and 116 include protection agents 144 and 164, respectively. Protection agents 144 and 164 are configured to intercept SCSI commands issued by their respective hosts to LUs via host devices (e.g. host devices 140 and 160). A protection agent may act on an intercepted SCSI command issued to a logical unit, in one of the following ways: send the SCSI commands to its intended LU; redirect the SCSI command to another LU; split the SCSI command by sending it first to the respective DPA and, after the DPA returns an acknowledgement, send the SCSI command to its intended LU; fail a SCSI command by returning an error return code; and delay a SCSI command by not returning an acknowledgement to the respective host. A protection agent 144, 164 may handle different SCSI commands, differently, according to the type of the command. For example, a SCSI command inquiring about the size of a certain LU may be sent directly to that LU, whereas a SCSI write command may be split and sent first to a DPA within the host's site.

In various embodiments, a protection agent may change its behavior for handling SCSI commands, for example as a result of an instruction received from the DPA. In certain embodiments, the behavior of a protection agent for a certain host device may depend on the behavior of its associated DPA with respect to the LU of the host device. In some embodiments, when a DPA behaves as a source site DPA for a certain LU, then during normal course of operation, the associated protection agent may split I/O requests issued by a host to the host device corresponding to that LU. In particular embodiments, when a DPA behaves as a target device for a certain LU, then during normal course of operation, the associated protection agent fails I/O requests issued by the host to the host device corresponding to that LU.

Referring back to FIG. 1, communication between a protection agent 144, 164 and its respective DPA 112, 124 may use any protocol suitable for data transfer within a SAN, such as fiber channel, or SCSI over fiber channel. The communication may be direct, or via a logical unit exposed by the DPA.

In certain embodiments, protection agents may be drivers located in their respective hosts. Alternatively, a protection agent may also be located in a fiber channel switch, or in any other device situated in a data path between a host and a storage system or on the storage system itself. In a virtualized environment, the protection agent may run at the hypervisor layer or in a virtual machine providing a virtualization layer.

Referring again to FIG. 1, the target storage system 120 exposes a journal LU 176 for maintaining a history of write transactions made to LU 156, referred to herein as a "journal." A journal may be used to provide access to storage at specified points in time, as discussed further below in conjunction with FIG. 2. In some embodiments, the journal may be stored across multiple LUs (e.g., using striping).

In the embodiment of FIG. 1, the target DPA 124 includes a journal processor 180 for managing the journal within LU 176. The journal processor 180 is configured to manage the journal entries of LU B 156. Specifically, journal processor 180 may enter write transactions received by the target DPA 124 from the source DPA 112 into the journal by writing them into the journal LU 176, read the undo information for the transaction from LU B 156, update the journal entries in the journal LU 176 with undo information, apply the journal transactions to LU B 156, and remove already-applied transactions from the journal.

In one embodiment, the journal processor 180 may be configured to perform processing described in the patent titled "METHODS AND APPARATUS FOR OPTIMAL JOURNALING FOR CONTINUOUS DATA REPLICATION" and with U.S. Pat. No. 7,516,287, issued Apr. 7, 2009, which is hereby incorporated by reference.

Embodiments of the data replication system may be provided as physical systems for the replication of physical LUs, or as virtual systems for the replication of virtual LUs. In one embodiment, a hypervisor may consume LUs and may generate a distributed file system on the logical units such as VMFS, for example, generates files in the file system and exposes the files as LUs to the virtual machines (each virtual machine disk is seen as a SCSI device by virtual hosts). In another embodiment, a hypervisor may consume a network-based file system and exposes files in the NFS as SCSI devices to virtual hosts.

Referring back to FIG. 1, in normal operation (sometimes referred to as "production mode"), the DPA 112 acts as a source DPA for LU 136 ("LU A"). Thus, protection agent 144 is configured to act as a source protection agent, specifically by splitting I/O requests to host device 140 ("Device A"). The protection agent 144 may send an I/O request to source DPA 112 and, after receiving an acknowledgement therefrom, may send the I/O request to LU 136. After receiving a second acknowledgement from storage system 108, the host 104 may acknowledge that the I/O request has successfully completed.

When source DPA 112 receives a replicated I/O request from protection agent 144, source DPA 112 may transmit certain I/O information characterizing the write request, packaged as a "write transaction", over WAN 128 to the target DPA 124 for journaling and for incorporation within target storage system 120. When applying write operations to storage system 120, the target DPA 124 may act as an initiator, and may send SCSI commands to LU 156 ("LU B").

The source DPA 112 may send its write transactions to target DPA 124 using a variety of modes of transmission, including inter alia (i) a synchronous mode, (ii) an asynchronous mode, and (iii) a batch mode. In synchronous mode, the source DPA 112 may send each write transaction to the target DPA 124, may receive back an acknowledgement from the target DPA 124, and in turns may send an acknowledgement back to protection agent 144.

In synchronous mode, protection agent 144 may wait until receipt of such acknowledgement before sending the I/O request to LU 136. In asynchronous mode, the source DPA 112 may send an acknowledgement to protection agent 144 upon receipt of each I/O request, before receiving an acknowledgement back from target DPA 124.

In batch mode, the source DPA 112 may receive several I/O requests and combines them into an aggregate "batch" of write activity performed in the multiple I/O requests, and may send the batch to the target DPA 124, for journaling and for incorporation in target storage system 120. In batch mode, the source DPA 112 may send an acknowledgement to protection agent 144 upon receipt of each I/O request, before receiving an acknowledgement back from the target DPA 124.

As discussed above, in normal operation, LU B 156 may be used as a backup of LU A 136. As such, while data written to LU A by host 104 is replicated from LU A to LU B, the target host 116 should not send I/O requests to LU B. To prevent such I/O requests from being sent, protection agent 164 may act as a target side protection agent for host device B 160 and may fail I/O requests sent from host 116 to LU B 156 through host device B 160.

Still referring to FIG. 1, in recovery mode, the target DPA 124 may undo the write transactions in the journal LU 176 so as to restore the target storage system 120 to an earlier state.

Figure 2:
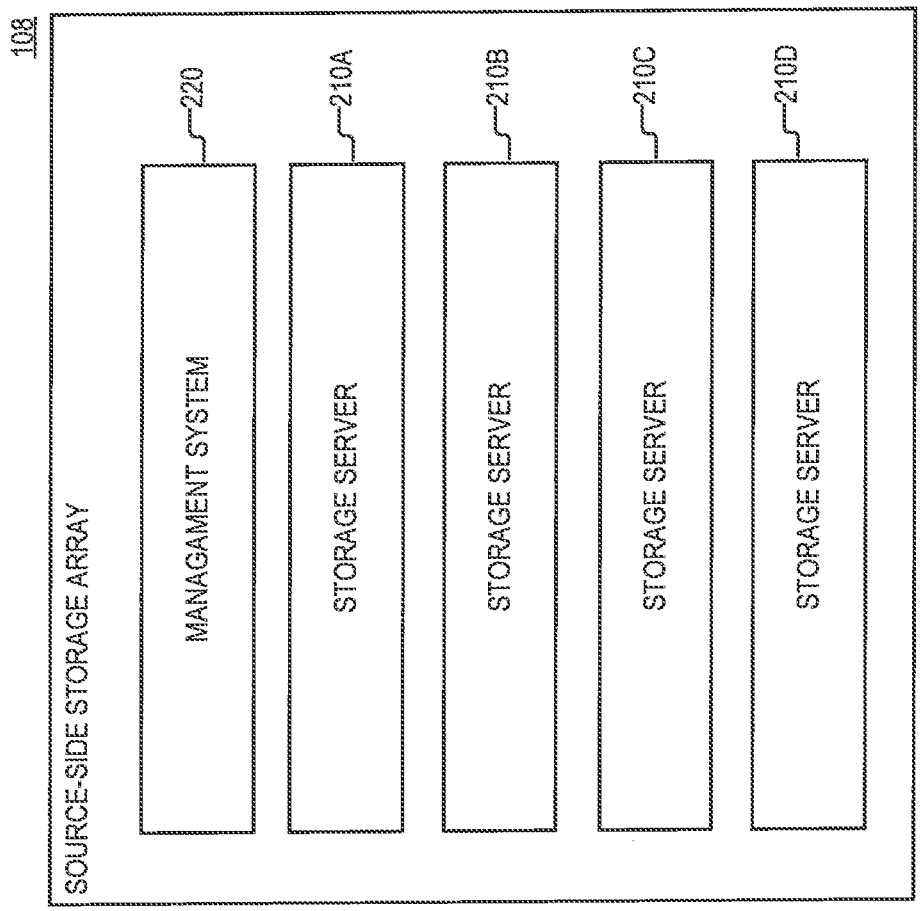
FIG. 2 is a diagram of an example of a source side storage system that is part of the distributed storage system of FIG. 1, according to aspects of the disclosure.

FIG. 2 is a diagram of the storage array 108 of the storage system 100, according to aspects of the disclosure. The storage array 108 may include a plurality of storage servers 210 and a management system 220 that are coupled to one another in a network (e.g., a mesh network). The network may include an InfiniBand network, a TCP/IP network, and/or any other suitable type of network. As is discussed further below, each of the storage servers 110 may include a multi-core processor that is running a BLOCK software stack on one of its cores. The BLOCK software stack may be configured to instantiate I/O service processes, which are sometimes also referred as a TRUCK processes, on at least some of the remaining cores of the multi-core processor. As is further discussed below, each I/O service process may include any suitable type of process that is configured to execute (either partially or fully) incoming I/O requests, as well as perform additional operations related to data storage and retrieval.

In existing distributed storage systems, each I/O service process may be configured to utilize 100% of the processing time (e.g., CPU time) of the processor core it is running on. In such instances, however, no multitasking is permitted on the processor core executing the I/O service process. Moreover, using standard preemption techniques to suspend (or otherwise pause) the execution of the I/O service process may cause the system to enter an unstable state as a result of the I/O service process becoming unavailable to respond to incoming I/O requests and/or complete in-flight I/O requests in a timely fashion. In this regard, the present disclosure provides improved techniques for dynamically preempting I/O service processes, and/or other processes that are used to service I/O requests in storage arrays and/or storage systems, without impairing system performance.

Figure 3:
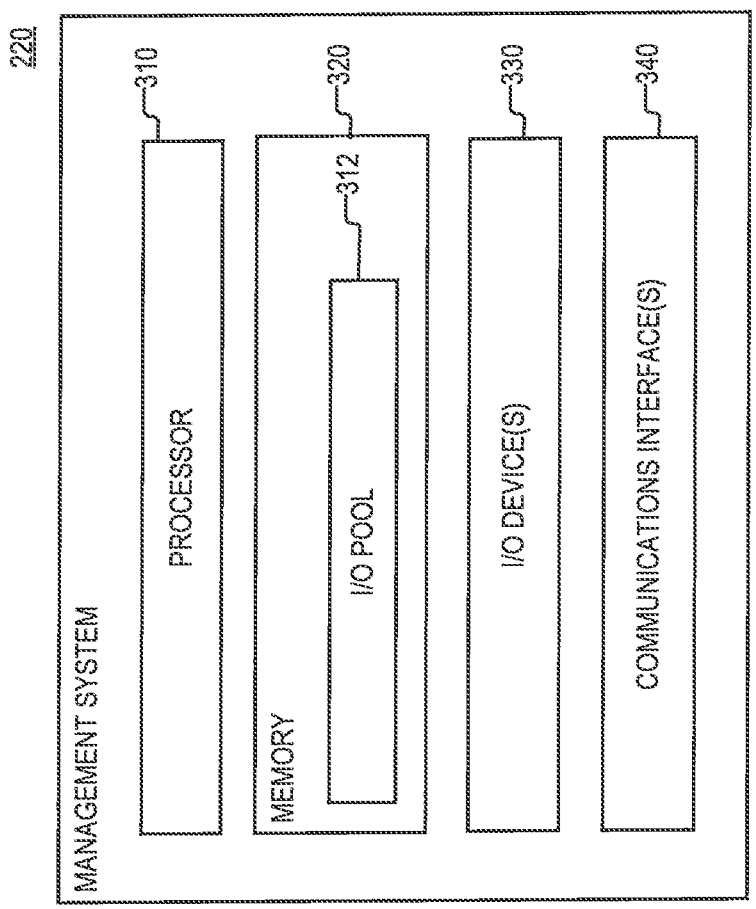
FIG. 3 is a diagram of an example of a management system that is part of the source side storage system of FIG. 2, according to aspects of the disclosure.

FIG. 3 is a diagram of an example of the management system 220, according to aspects of the disclosure. As illustrated, the management system 220 may include one or more processors 310, a memory 320, I/O device(s) 330, and communications interface(s) 340 that are operatively coupled to one another. The processor 310 may include any of one or more general-purpose processors (e.g., x86 processors, RISC processors, ARM-based processors, etc.), one or more Field Programmable Gate Arrays (FPGAs), one or more application specific circuits (ASICs), and/or any other suitable type of processing circuitry. The memory 320 may include any suitable type of volatile and/or non-volatile memory. In some implementations, the memory 320 may include one or more of a random-access memory (RAM), a dynamic random memory (DRAM), a flash memory, a hard drive (HD), a solid-state drive (SSD), a network accessible storage (NAS), and or any other suitable type of memory device. The I/O device(s) 330 may include any suitable type of input and/or output device, such as one or more mice, one or more keyboards, one or more microphones, or one or more display screens, for example. The communications interface(s) 340 may include any suitable type of communications interface, such as one or more Ethernet adapters, one or more Wi-Fi adapters (e.g., 802.1414 adapters), and one or more Long-Term Evolution (LTE) adapters, for example.

In some implementations, the management system 220 may be configured to pool I/O requests that are incoming to the storage array 108 and/or the storage system 100 in an I/O pool 312. The storage servers 210 may subsequently retrieve I/O requests from the I/O pool 312, and service those I/O requests accordingly. Although in the present example the I/O pool 312 is stored in the memory 320, alternative implementations are possible in which the I/O pool 312 is stored elsewhere. For example, the I/O pool 312 may be stored in another computing device that is part of the storage system 100 and/or the storage array 108. Furthermore, in some implementations, each of the storage server 210 may maintain a local I/O pool in the memory of that storage server 210. In such implementations, the I/O pool 312 may be stored on one of the storage servers 210 (e.g., the storage server 210), and each of the remaining storage servers 210 in the storage array 108 may similarly have another I/O pool that is stored in the respective memory of that server. Stated succinctly, the present disclosure is not limited to any specific location and/or implementation of the I/O pool 312.

In some implementations, the management system 220 may be configured to execute a process for dynamically preempting I/O service processes executed by any of the storage servers 210. Dynamically preempting I/O service processes that are executed on the storage servers 210 allows any processor core in the storage servers 210 to be shared between an I/O service process and at least one other process to achieve a desired user operation pattern, without bringing the storage system 100 and/or the storage array 108 into an unstable state. The process for dynamically preempting I/O service processes is discussed further below with respect to FIGS. 7-9.

Figure 4:
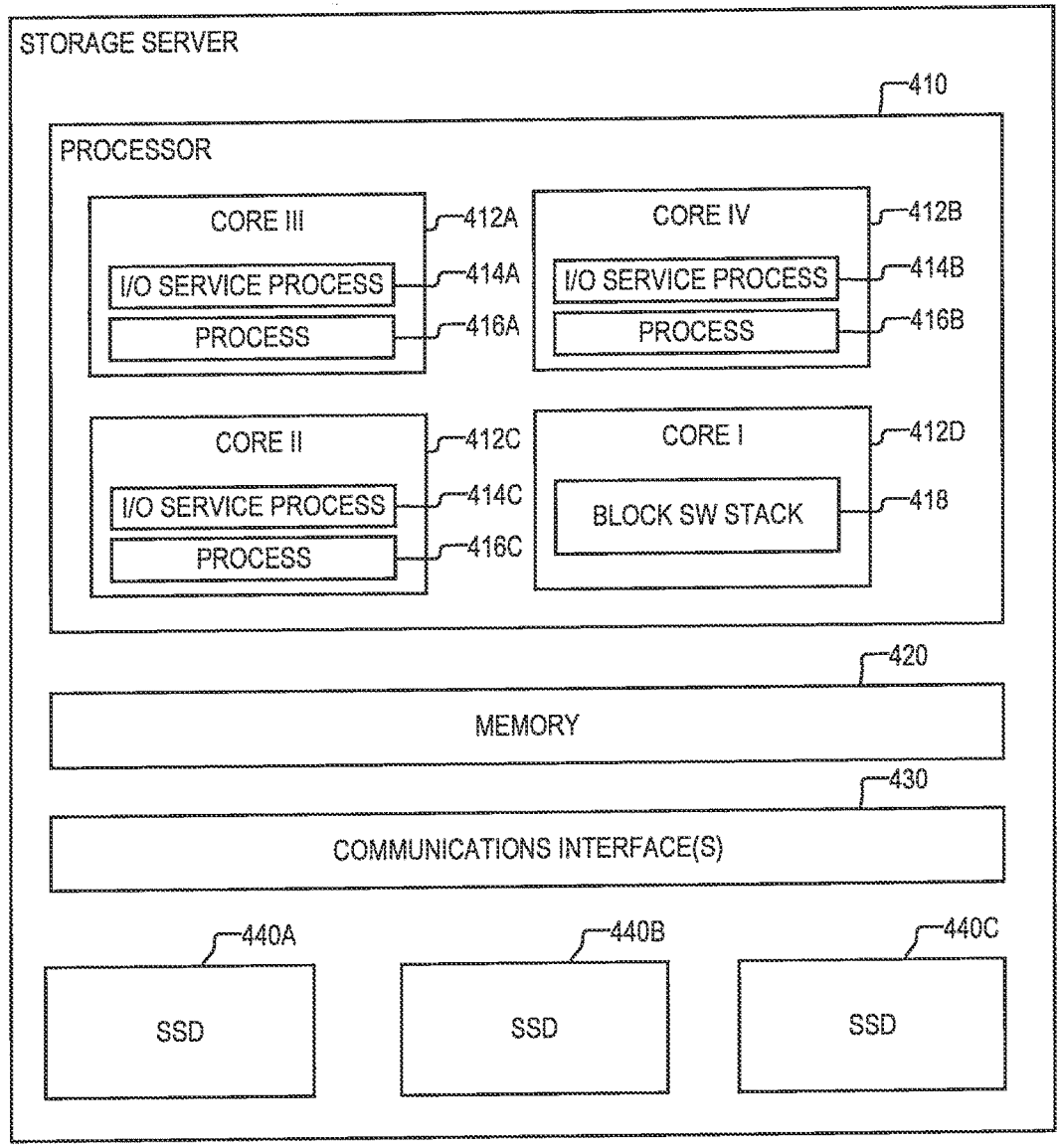
FIG. 4 is a diagram of an example of a storage server that is part of the source side storage system of FIG. 2, according to aspects of the disclosure.

FIG. 4 is a diagram of an example of the storage server 210A, according to aspects of the disclosure. As illustrated, the storage server 210 may include a processor 410, a memory 420, a communications interface(s) 430, and a plurality of storage devices that are operatively coupled to one another. The processor 410 may include any of one or more general-purpose processors (e.g., x86 processors, RISC processors, ARM-based processors, etc.), one or more Field Programmable Gate Arrays (FPGAs), one or more application specific circuits (ASICs), and/or any other suitable type of processing circuitry. The memory 420 may include any suitable type of volatile and/or non-volatile memory. In some implementations, the memory 320 may include one or more of a random-access memory (RAM), a dynamic random memory (DRAM), a flash memory, a hard drive (HD), a solid-state drive (SSD), a network accessible storage (NAS), and or any other suitable type of memory device. The communications interface(s) 430 may include any suitable type of communications interface, such as one or more Ethernet adapters, one or more Wi-Fi adapters (e.g., 802.1414 adapters), and one or more Long-Term Evolution (LTE) adapters, for example. The storage devices 440 may be configured to form at least a portion of the LU 108. In the present example, the storage devices 440 are solid state drives (SSD). However, alternative implementations are possible, in which at least one of the storage devices is a spinning hard disk (HD), a flash driver, a Read-Only Memory (ROM), a Random-Access Memory (RAM), and/or any other suitable type of volatile and non-volatile memory.

According to the present example, the processor 410 includes four cores 412. Each of the cores 410A-C may be configured to execute a different I/O service process 414, as well as at least one additional process 416. Each I/O service process 414 may be instantiated by a BLOCK software stack 418 that is executed on the processor core 412D. Each I/O service process 414 may include one or more processor-executable instructions, which when executed by the I/O service process's respective core 412 cause the respective core 412 to retrieve, from the I/O pool 312 one or more I/O requests that are incoming to the storage system 100 and execute those requests by retrieving and/or storing data on the storage devices 440. In some implementations, each I/O service process 414 may include no internal threads that are instantiated by the I/O service process 414. Alternatively in some implementations, each I/O service process 414 may include one or more threads that are instantiated within the I/O service process 414. In this regard, it will be understood that the present disclosure is not limited to any specific implementation of the I/O service processes 414.

Each process 416 may include one or more processor-executable instructions for performing a function that is different from the function of the I/O service process 414 that is executed by the same processor core as the process 416. According to the present disclosure, it will be understood that each process 416 may be a process implementing any suitable software stack and/or function, which is desired to be executed on the same core with one of the I/O service processes 414. Moreover, any two of the processes 416 may be different from one another with respect to the function they perform and/or the processor-executable instructions that implement them.

Although FIG. 4 is presented in the context of the storage server 210A, it will be understood that any other storage server in the storage array 108 has the same or similar configuration as the storage server 210A. Moreover, it will be understood that further implementations are possible in which at least two of the storage servers 210 have different hardware configurations. Stated succinctly, the present disclosure is not limited to any specific configuration for any of the storage servers 210.

Figure 5:
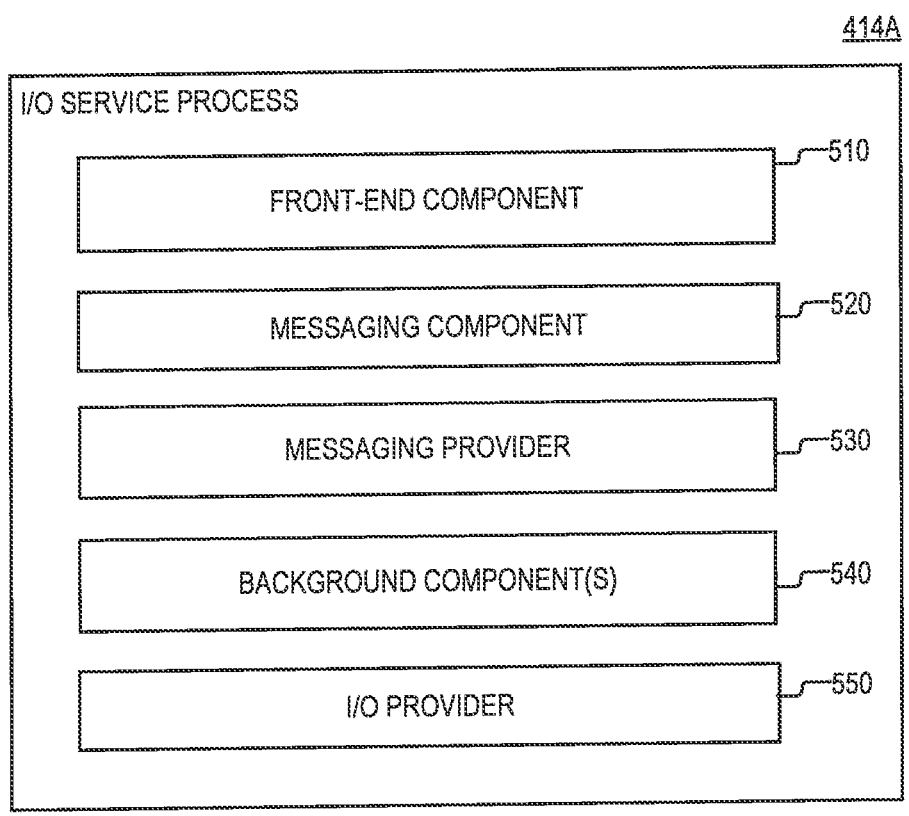
FIG. 5 is a diagram of an I/O service process that is executed by the storage server of FIG. 4, according to aspects of the disclosure.

FIG. 5 is a diagram of the I/O service process 414A, which is executed on the processor core 412A of the storage server 210A. As illustrated, the I/O service process 414A may include a frontend component 510, a messaging component 520, the messaging provider 530, the background component(s) 540, and I/O provider(s) 550. The frontend component 510 may be configured to pull I/O requests from the I/O pool 312 for execution by the I/O provider(s) 550. The messaging component 520 may include any suitable type of software component that is configured to send and receive messages from storage servers 210, other than the storage server on which the messaging component 520 is executed. The messaging provider 530 may be configured to poll the messaging component 520 for received messages and/or process the received messages. The background component(s) 540 may include one or more components configured to perform background functions that are normally found in storage systems, such as defragmentation, and RAID rebuild, etc.

The I/O provider(s) 550 may include one or more I/O providers that are executed on the processor core 412A. Each of the I/O providers may be configured execute incoming I/O requests that incident on the storage system 100, the storage server 210A, and/or the I/O service process 414A. In some implementations, each I/O provider may be arranged to fully execute incoming I/O requests. Alternatively, in some implementations, each I/O provider may be configured to partially execute an I/O request by implementing a particular stage of an I/O request fulfillment pipeline. Stated succinctly, the present disclosure is not limited to any specific implementation of the I/O provider(s) 550.

In the present example, each of the frontend component 510, the messaging component 520, the messaging provider 530, the background component(s) 540, and the I/O provider(s) 550 is implemented as a separate thread that is instantiated by and executed within the user space of the I/O service process 414A. However, alternative implementations are possible in which any of the frontend component 510, the messaging component 520, the messaging provider 530, the background component(s) 540, and the I/O provider(s) 550 is executed outside of the user space of the I/O service process 414A. For the purposes of the present disclosure, the terms "process" and "thread" may be used interchangeably to refer to a sequence of processor-executable instructions that can be managed independently by a scheduler that is part of an operating system and/or another type of scheduler that is itself managed by the operating system scheduler.

Figure 6:
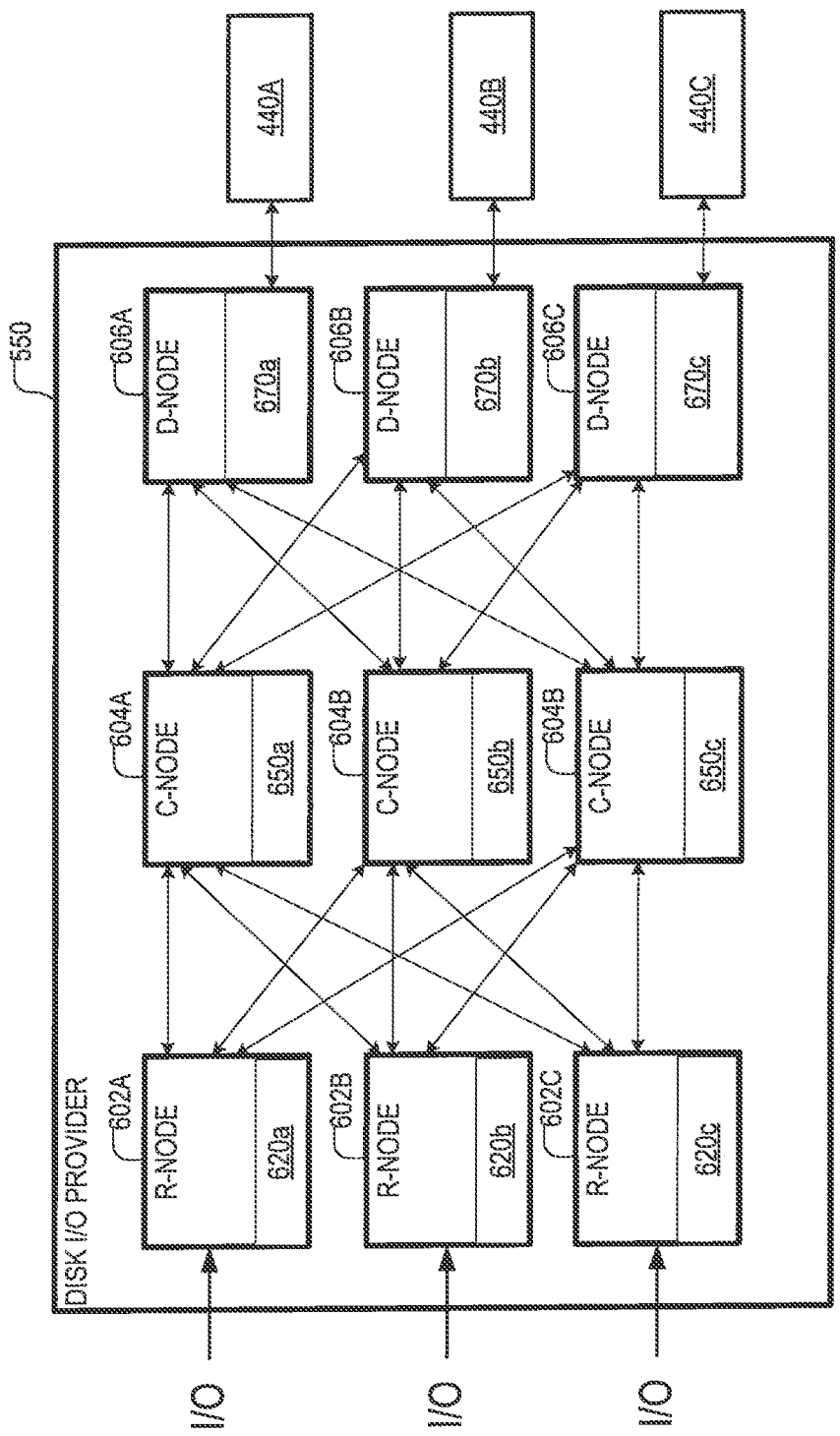
FIG. 6 is a diagram of an example of a disk I/O provider that is executed within the I/O service process of FIG. 5, according to aspects of the disclosure.

FIG. 6 is diagram illustrating an example of one particular implementation of the I/O provider(s) 550. According to the present example, the I/O provider(s) 550 includes I/O providers 602, 604, and 606, which are herein referred to as routing nodes, control nodes, and data nodes respectively.

The routing nodes 602 may be configured to terminate Read/Write commands received at the storage system 100 and route them to appropriate control nodes 604 and data nodes 606 for further execution. In doing so, the routing nodes 602 may distribute a workload over multiple control nodes 604 and data nodes 606. In some implementations, any of the routing nodes 602 may be configured to write I/O requests (e.g., SCSI I/O requests) to selected ones of the control nodes 604 for further processing. In some implementations, each of the routing nodes 602 may be provided with a respective address-to-control-module (A2C) table 620 that identifies a plurality of control nodes (e.g., the control nodes 604) and a different respective LDA range that is managed by each of the control nodes. In this regard, the A2C table 620 may define a plurality of logical spaces that are managed by different control nodes 604. In the present example, a copy of the A2C table 620 is stored on each of the routing nodes 602. However, it will be understood that the present disclosure is not limited to any specific method for allocating respective logical spaces to the control nodes 604.

The control nodes 604 may be configured to control the execution of control node commands supplied by the routing nodes 602. The control node commands may be used to implement read requests, write requests, and/or any other suitable I/O request. In addition, each of the control nodes 604 may maintain and manage key metadata elements. Each of the control nodes 604 may be configured to receive control node commands from the routing nodes and communicate with the data nodes 606 to execute the commands. In some implementations, each control node 604 may maintain an address-to-data node table (H2D) table 650 that identifies a plurality of data nodes and a different respective hash digest range that is associated with each of the data nodes. In this regard, the H2D table may effectively define a plurality of logical spaces that are managed by different data nodes 606. In the present example, a copy of the H2D table is stored on each of the control nodes 604.

The data nodes 606 may be configured to control the execution of data node commands supplied by the control nodes 604. Each of the data nodes 606 may be attached to one or more of the storage devices 440. Each of the data nodes may store in memory a hash-to-physical-address (H2P) table 670. The H2P table 670 may identify a plurality of physical addresses in the storage devices 440, and different respective hash digest that is mapped to each of the physical addresses. In this regard, the H2P table 670 may be used to map hash digests received from the control nodes to different physical locations in the volumes 160 managed by the data nodes 606. In the present example, each of the data nodes 606 includes a different table H2P table 670 that is specific to that data node.

In operation, any of the routing nodes 602 may receive an I/O request that spans a range of logical data addresses (LDAs) from the multipath agent 608. The request may include a block of data and an opcode identifying an action that is required to be performed. In response to the request, the routing node 602 may use its respective A2C table to identify a plurality of control nodes 604 based on the A2C table. Afterwards, the routing node 602 may decompose the I/O request into a plurality of control node commands and forward the control node commands to the identified control nodes 604 for further processing.

In operation, any of the control nodes 604 may receive a control node command that is generated by one of the routing nodes 602. The control node command may include a data payload and an opcode identifying an action that is required to be performed. Upon receiving the control node command, the control node 604 may decompose the control node command into a plurality of data node commands and forward each of the data node commands. In some implementations, each of the data node commands may include a different page of data along with a hash digest of the page. Each data node command may then be forwarded to a respective data node 606 that is selected based on the H2D table 650 and the data node command's hash digest (i.e., the data node responsible for managing the range of hash digests which the data node command's respective hash digest falls into).

In operation, any of the data nodes 606 may receive a data node command that is generated by one of the control nodes 604. Next, the data node 606 may search its respective H2P table to identify a physical address in one of the storage devices 440 that corresponds to the hash digest that is contained in the data node command. Afterwards, the data node 606 may store the payload of the data node command (i.e., the page of data contained in the data node command) at the identified physical address.

Figure 7:
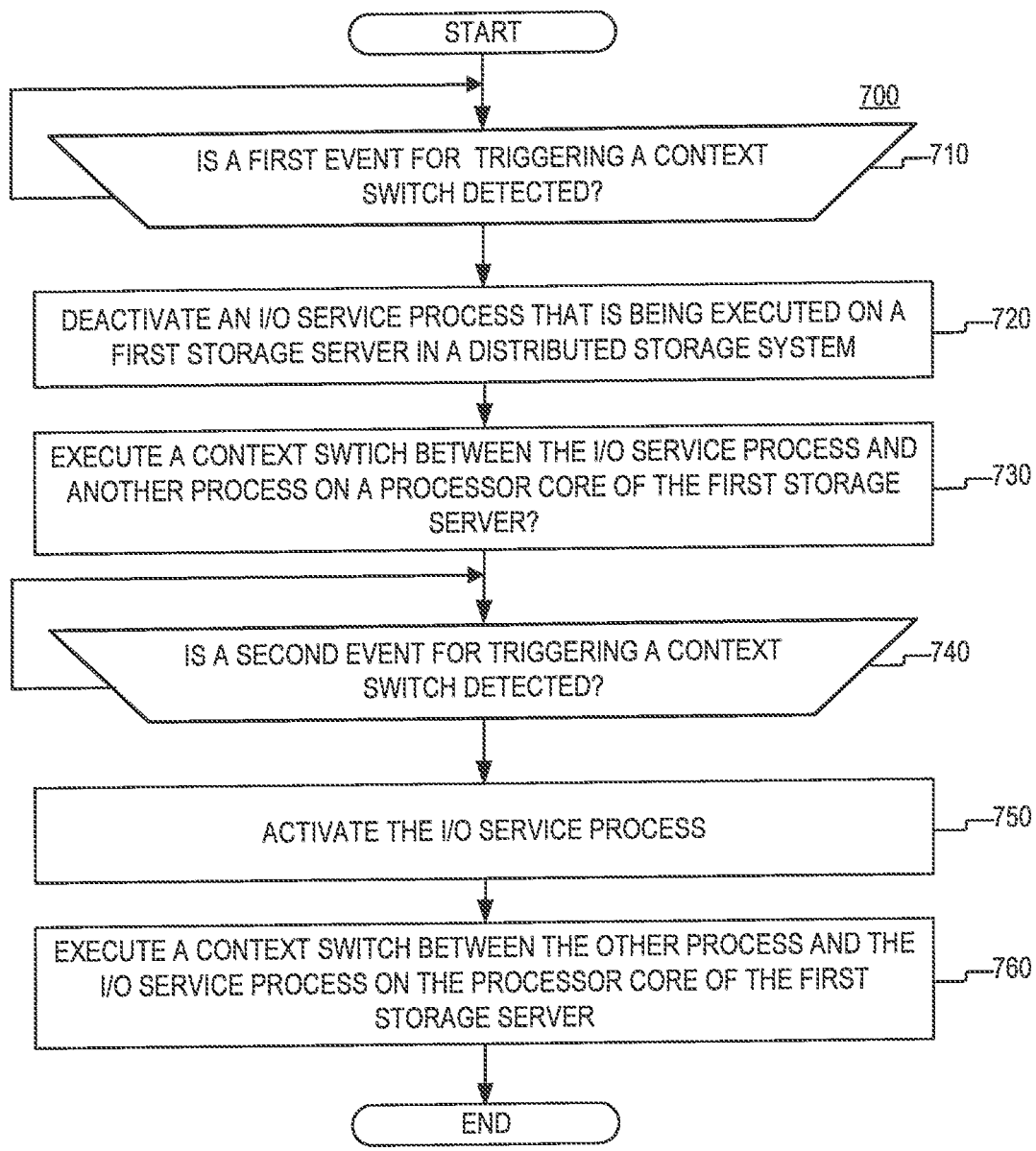
FIG. 7 is a flowchart of an example of a process, according to aspects of the disclosure.

FIG. 7 is a flowchart of an example of a process 700 for dynamic multitasking in a storage system, according to aspects of the disclosure. Although in the example of FIG. 7 the process 700 is presented in the context of the storage server 210A, it will be understood that the process 700 can be performed on any suitable storage server in the storage array 108 and/or storage server in general. Furthermore, although in the example of FIG. 7 the process 700 is presented in the context of the processor core 412A of the storage server 210A, it will be understood that the process 700 can be performed any given processor core of the storage server 210A.

At step 710, the management system 220 detects whether a first event is generated in the management system 220. If the first event is not generated, step 710 is repeated again. Otherwise, if the first event is generated, the process 700 proceeds to step 720. In some implementations, the first event may be an interrupt and/or any other suitable type of system signal. Additionally or alternatively, in some implementations, the first event may be generated in response to the receipt of a message at any of the communications interface(s) 340 of the management system 220. Additionally or alternatively, in some implementations, the first event may be generated based on the receipt of a user input at any of the I/O device(s) 330. Additionally or alternatively, the first event may be generated in response to the management system 220 detecting that a particular operational characteristic of the storage array (e.g., latency, rate at which incoming I/O requests are arriving at the storage system 100, etc.) has fallen below a predetermined threshold. According to the present example, the first event is detected by the management system 220 while the I/O service process 414A is being executed by the processor core 412A of the storage server 410A.

At step 720, the I/O service process 414A is deactivated by the management system 220. Step 720 is described in further detail with respect to FIG. 8.

At step 730, the management system 220 transmits an instruction to the storage server 210A, which when received at the storage server 210A causes the processor core 412A to execute a context switch between the I/O service process 414A and the process 416A. As a result of the context switch being performed, the processor core 412A stops executing the I/O service process 414A and begins executing the process 416A. In some implementations, performing the context switch may include one or more of: (i) saving, to the memory 420, the values of one or more context variables of the I/O service process 414A that are stored in the registers of the processor core 412A, (ii) loading, from the memory 420, the value of one or more context variables of the process 416A into the registers the of the processor core 412A, and (iii) causing the processor core 412A to begin executing the process 416A.

At step 740, the management system 220 detects whether a second event is generated in the management system 220. The second event may or may not be the same type of event as the first event. If the second event is not generated, step 740 is repeated again. Otherwise, if the first event is generated, the process 700 proceeds to step 750.

In some implementations, the second event may be an interrupt and/or any other suitable type of system signal. Additionally or alternatively, in some implementations, the second event may be generated in response to the receipt of a message at any of the communications interface(s) 340 of the management system 220. Additionally or alternatively, in some implementations, the second event may be generated based on the receipt of a user input at any of the I/O device(s) 330. Additionally or alternatively, the second event may be generated in response to the management system 220 detecting that a particular operational characteristic of the storage array (e.g., latency, rate at which I/O requests are arriving at the storage system 100, etc.) has risen above a predetermined threshold. According to the present example, the second event is detected by the management system 220 while the I/O service process 414A is being executed by the processor core 412A of the storage server 410A.

At step 750, the I/O service process 414A is reactivated by the management system 220. Step 750 is described in further detail with respect to FIG. 9.

At step 760, the management system 220 transmits an instruction to the storage server 210A, which when received at the storage server 210A causes the processor core 412A to execute a context switch between the process 416A and the I/O service process 414A. As a result of the context switch being performed, the processor core 412A stops executing the process 416A and begins executing the I/O service process 414A. In some implementations, performing the context switch may include one or more of: (i) saving, to the memory 420, the values of one or more context variables of the process 416A that are stored in the registers of the processor core 412A, (ii) loading, from the memory 420, the value of one or more context variables of the I/O service process 414A into the registers the of the processor core 412A, and (iii) causing the processor core 412A to begin executing the I/O service process 414A.

Figure 8:
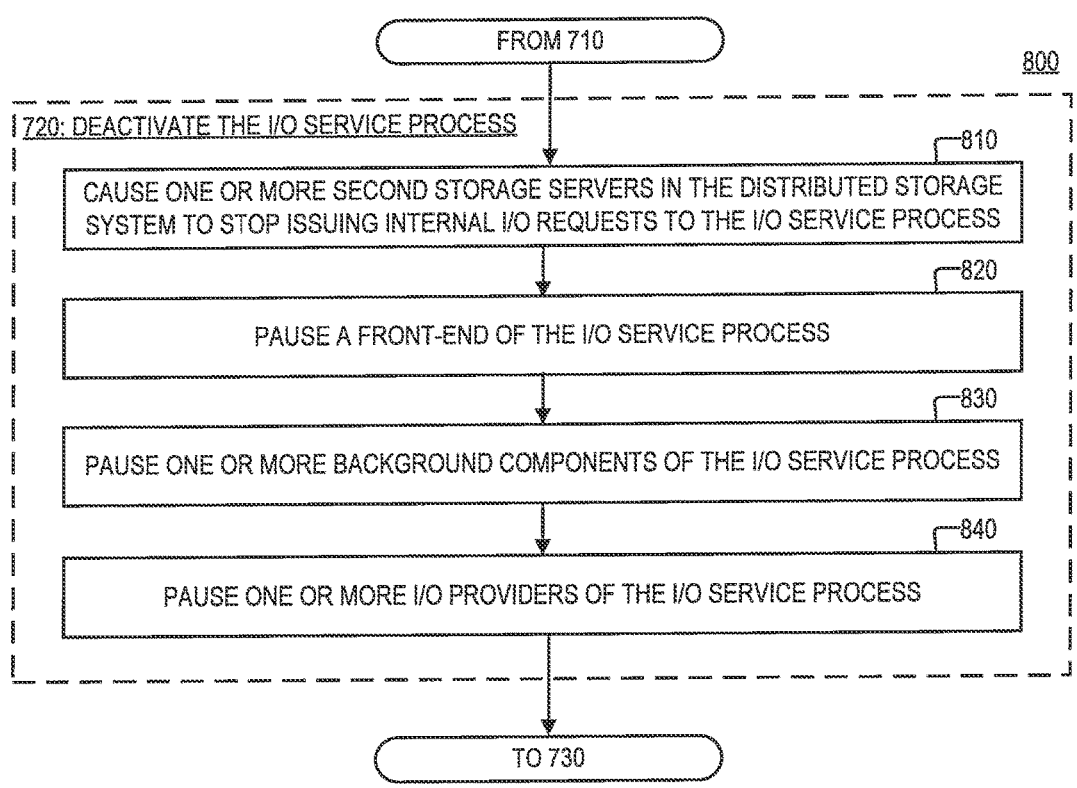
FIG. 8 is a flowchart of an example of a sub-process associated with the process FIG. 7, according to aspects of the disclosure.

FIG. 8 is a flowchart of an example of a process 800 for deactivating the I/O service process 414A, as specified by step 720 of the process 700, according to aspects of the disclosure.

At step 810, the management system 220 causes the storage servers 210B-D to stop issuing internal I/O requests to the I/O service process 414A. In some implementations, the management system 220 may transmit an instruction to the storage servers 210B-D to stop transmitting to the I/O service process 414A internal I/O requests. In some implementations, the instruction may include an identifier which can be used to distinguish the I/O service process 414A from all other I/O service processes that are executed on the storage server 210A. In response to receiving the instruction, the storage servers 210B-D may stop issuing internal I/O requests to the I/O service process 414A, but they may continue transmitting internal I/O requests to the remaining I/O service processes that are being executed on the storage server 210A (i.e., the I/O service processes 414B-C). In this regard, including the identifier corresponding to the I/O service process 414A into the instruction to stop transmitting internal I/O requests may allow the storage servers 210B-D to continue interacting with the remaining I/O service processes that are executing on the storage server 210A after they have stopped interacting with the I/O service process 414A.

At step 820, the management system 220 pauses the frontend component 510 of the of the I/O service process 414A. In some implementations, the management system 220 may transmit to the I/O service process 414A (or storage server 210A) an instruction which when received by the I/O service process 414A (or storage server 210A) causes the frontend component 510 to stop retrieving external I/O requests from the I/O pool 312. In some implementations, in response to receiving the instruction, the I/O service process 414A may set a first synchronization barrier which prevents the frontend component 510 from retrieving new I/O requests from the I/O pool 312, and causes it to (ii) wait for any retrievals that are currently in progress to complete, before (iii) returning an acknowledgement to the management system 220 that the frontend component 510 is paused.

In some implementations, internal I/O requests may include I/O requests received by the I/O service process 414A via the frontend component 510, whereas external I/O requests may include I/O requests received by the I/O service process 414A via the messaging component 520. Additionally or alternatively, in some implementations, external I/O requests may include requests that are obtained from an I/O pool that is shared among all I/O service processes in the storage system 100 (and/or storage servers 210), such as the I/O pool 312. By contrast, internal I/O requests may include I/O requests that are transmitted from one storage server 210 to another, and which are designated for execution by a specific I/O service process. In some implementations, unlike external I/O requests, any internal I/O request may include an identifier that identifies an I/O service process that is desired/designated to execute the internal I/O request.

At step 830, the management system 220 pauses the background component(s) 540 of the I/O service process 414A. In some implementations, the management system 220 may transmit to the I/O service process 414A (or storage server 210A) an instruction which when received by the I/O service process 414A (or storage server 210A) causes the background component(s) 540 to stop executing new tasks. In some implementations, in response to receiving the instruction, the I/O service process 414A may set a second synchronization barrier which prevents any of the background component(s) 540 from starting new tasks, and (ii) wait for any tasks that are currently in progress to complete, before (iii) returning an acknowledgement to the management system 220 that the background component(s) 540 have been paused.

At step 840, the management system 220 pauses the I/O provider(s) 550 of the of the I/O service process 414A. In some implementations, the management system 220 may transmit to the I/O service process 414A (or storage server 210A) an instruction which when received by the I/O service process 414A (or storage server 210A) causes the background component(s) 540 to stop executing new tasks. In some implementations, in response to receiving the instruction, the I/O service process 414A may set a third synchronization barrier which prevents any of the I/O provider(s) 550 executing new I/O requests (or tasks), and causes it to (ii) wait for any I/O requests (or tasks) that are currently in progress to complete, before (iii) returning an acknowledgement to the management system 220 that the I/O provider(s) 550 have been paused.

In some implementations, step 840 may be performed only after step 830 is completed. If the I/O provider(s) 550 are paused as they are being fed instructions from the background component(s) 550, some of the instructions may be stuck in the I/O provider and lost as a result. Moreover, read/write commands issued to by the I/O provider(s) 550 to the storage device 440 may never return (as they are returned by the I/O provider(s) 550). According to the present example, the process 800 is performed in an order in which the I/O service process 414A is first stopped from handling new I/O requests (by executing steps 810 and 820), after which other internal components of the I/O service process 414A are paused (e.g., by executing steps 830 and 840). In some implementations, executing step 830 after steps 810 and 820 have been completed because In some implementation, step 830 may be performed after steps 810 and 820. As noted above, step 810 stops new I/O requests coming from other storage servers 210, and step 820 stops the I/O service process 414A from fetching new I/O requests. This is so because, unless: (i) the receipt/fetching of I/O requests has been stopped first, and (ii) a predetermined waiting period has passed (e.g., after the stoppage and before the background component(s) 540 are disabled), I/O requests that are fetched/received at the I/O service process 414A may become stuck. In other words, the processing of fetched/received I/O requests requires the background component(s) 540 to be available, and for this reason, in some implementations, it is desirable to pause the fetching/receipt of I/O requests, and wait for a given waiting period before the background component(s) 540 are paused, in order to allow all in-flight I/O requests to complete.

In some implementations, step 840 may be performed after step 830. As noted above, step 830 stops the background component(s) 540. The I/O provider(s) 550 however may receive read/write instructions from the background components and interact with the storage devices 440 to complete the read/write requests. In this regard, in some implementations, it is desirable to pause the background component(s) 540 first and wait for all in-flight operations to complete before stopping the I/O providers. Otherwise, read/write requests sent to the storage devices 440 may never return to the background component(s) 540, as they are being returned by the I/O provider(s) 550.

In some implementations, steps 810 and 820 may be performed concurrently or in reverse order. Furthermore, in some implementation, step 830 may be performed after steps 810 and 820. As noted above, step 810 stops new I/O requests coming from other storage servers 210, and step 820 stops the I/O service process 414A from fetching new I/O requests. In this regard, unless: (i) the receipt/fetching of I/O requests has been stopped first, and (ii) a predetermined waiting period has passed (e.g., after the stoppage and before the background component(s) 540 are paused), I/O requests that are fetched/received at the I/O service process 414A may become stuck. Put differently, the processing of fetched/received I/O requests requires the background component(s) 540 to be available, and for this reason, in some implementations, it may be advantageous to pause the fetching/receipt of I/O requests, and wait for a given waiting period before the background component(s) 540 are paused, in order to allow all in-flight I/O requests to complete.

Moreover, in some implementations, step 840 may be performed after step 830. As noted above, step 830 stops the background component(s) 540. The I/O provider(s) 550 may, however, receive read/write instructions from the background component(s) 540 and interact with the storage devices 440 to complete the read/write requests. In this regard, in some implementations, it may be advantageous to pause the background component(s) 540 first and wait for all in-flight operations to complete before stopping the I/O provider(s) 550. Otherwise, read/write requests sent to the storage devices 440 may never return to the background component(s) 540, as they are being returned by the I/O provider(s) 550.

Although in the example of FIG. 8, step 830 is executed after steps 810 and 820, and step 840 is executed after step 840, it will be understood that alternative implementations are possible in which at least two of the tasks 810-840 are performed in a different order or performed concurrently. Although in the present example only the frontend component 510, the background component(s) 540, and the I/O provider(s) 550 are paused, it will be understood that further implementations are possible in which any suitable component of the I/O service process 414A is paused. Moreover, although steps 820-840 are accomplished by the transmission of different respective instructions from the management system 220, it will be understood that alternative implementations are possible in which steps 820-840 are accomplished by the transmission of a single instruction to the storage server 210A, and/or a different number of instructions. Furthermore, although in the example of the process 800, a different synchronization barrier is used to pause the frontend component 510, the background component(s) 540, and the I/O provider(s) 550, in some implementations, two or more of these components may be paused using the same synchronization barrier.

Figure 9:
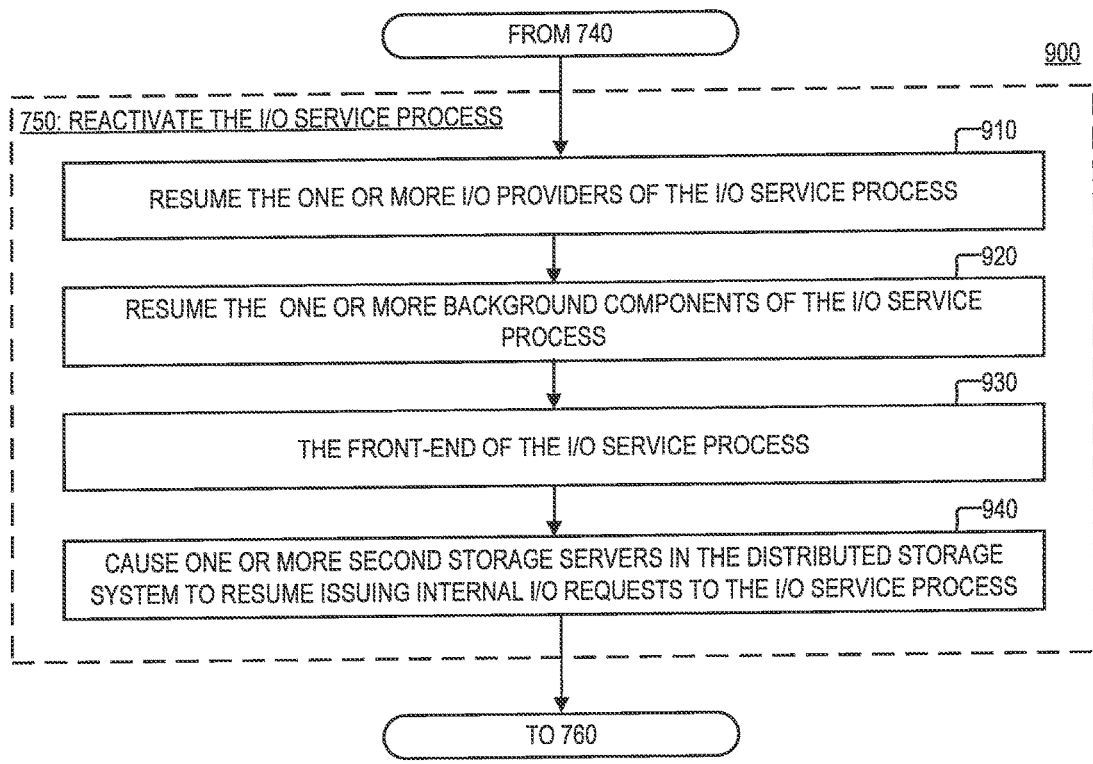
FIG. 9 is a flowchart of an example of a sub-process associated with the process FIG. 7, according to aspects of the disclosure.

FIG. 9 is a flowchart of an example of a process 900 for reactivating the I/O service process 414A, as specified by step 750 of the process 700, according to aspects of the disclosure.

At step 910, the I/O provider(s) 550 of the I/O service process 414A are resumed by the management system 220. In some implementations, the management system 220 may transmit to the I/O service process 414A (or storage server 210A) an instruction which when received by the storage server 210A causes the storage server 210A to resume the I/O provider(s) 550. In some implementations, in response to receiving the instruction, the I/O service process 414A may release the third synchronization barrier (discussed with respect to step 840 of the process 800), thereby causing the I/O provider(s) 550 to resume servicing I/O requests.

At step 920, the background component(s) 540 of the process of the I/O service process 414A are resumed by the management system 220. In some implementations, the management system 220 may transmit to the I/O service process 414A (or storage server 210A) an instruction which when received by the storage server 210A causes the storage server 210A to resume the background component(s) 540. In some implementations, in response to receiving the instruction, the I/O service process 414A may release the second synchronization barrier (discussed with respect to step 830 of the process 800), thereby causing background component(s) 540 to resume performing new tasks.

At step 930, the frontend component 510 of the I/O service process 414 is resumed by the management system 220. In some implementations, the management system 220 may transmit to the I/O service process 414A (or storage server 210A) an instruction which when received by the storage server 210A causes the storage server 210A to resume the resume the frontend component 510. In some implementations, in response to receiving the instruction, the I/O service process 414A may release the first synchronization barrier (discussed with respect to step 820 of the process 800), thereby causing the frontend component 510 to begin retrieving new I/O requests from the I/O pool 312.

At step 940, the management system 220 causes the storage servers 210B-D to resume issuing internal I/O requests to the I/O service process 414A. In some implementations, the management system 220 may transmit an instruction to the storage servers 210B-D to resume transmitting the I/O service process 414A internal I/O request. As discussed above, with respect to step 810 of the process 800, in some implementations, the instruction may include an identifier which can be used to distinguish the I/O service process 414A from all other I/O service processes that are executed on the storage server 210A.

According to the example of FIG. 9, the process 900 is performed in the reverse order of the process 800. Specifically, in the example of FIG. 9, the I/O provider(s) 550 are resumed (at step 910) before the background component(s) 550 (at step 920). As noted above, the I/O provider(s) 550 may handle read/write instructions provided by the background component(s) 540, so resuming the I/O provider(s) 550 before the background component(s) 540 may ensure that all facilities necessary for the background component(s) 540 to fulfill their functions would be in place by the time the background component(s) 540 are resumed. For this reason, in some implementations, it may be advantageous to perform step 910 before step 920.

Furthermore, in the example of FIG. 9, the background component(s) 540 are resumed (at step 920) before the fetching/receipt of I/O requests is resumed at steps (930 and 940). As noted above, the background component(s) 540 provide services that are necessary for the processing of fetched/received I/O requests. In this regard, resuming the background component(s) 540 before the frontend 510 is resumed, and/or before the issuance of internal I/O requests to the I/O service process 414A is re-started, may ensure that all facilities necessary for the processing of fetched/received I/O requests are in place by the time the fetching/receiving of I/O requests is resumed. For this reason, in some implementations, it may be advantageous to perform step 920 before steps 930 and 940. Steps 930 and 940, in some implementations, may be performed concurrently or in reverse order.

Although in the present example, step 910 is performed before step 920, and step 920 is performed before steps 930 and 940, it will be understood that alternative implementations are possible in which at least two of the tasks 910-940 are performed in a different order or performed concurrently. Moreover, although steps 910-930 are accomplished by the transmission of different respective instructions from the management system 220, it will be understood that alternative implementations are possible in which steps 910-930 are accomplished by the transmission of a single instruction to the storage server 210A, and/or a different number of instructions.

Figure 10:
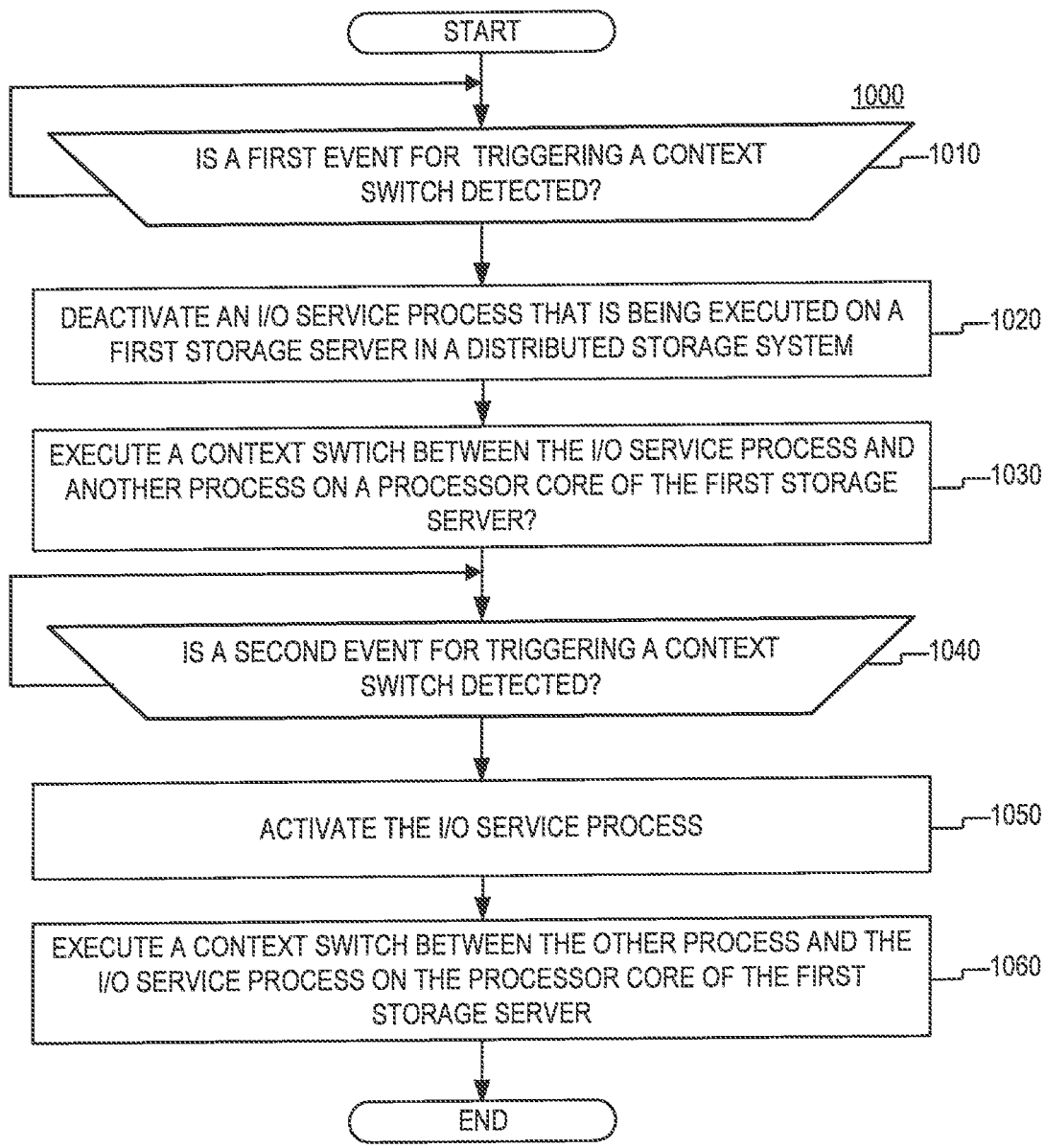
FIG. 10 is a diagram of an example of a process, according to aspects of the disclosure.

FIG. 10 is flowchart of an example of a process 1000 for dynamic multitasking, according to aspects of the disclosure. According to the example of FIG. 10, the process 1000 is similar to the process 700, which is discussed with respect to FIG. 7. However, unlike the process 700, the process 1000 is performed by the storage server 210A (e.g., by the operating system of the storage server 210A and/or another execution environment that is executed over the operating system), without the involvement of the management system 220. Although the example of the process 1000 is presented in the context of the storage server 210A, it will be understood that the process 1000 may be performed by any storage server in a storage system.

At step 1010, the storage server 210A detects whether a first event is generated in the storage server 210A. If the first event is not generated, the step 1010 is repeated again. Otherwise, if the first event is generated, the process 1000 proceeds to step 1020. The first event may include any suitable type of interrupt or other system signal. The first event may be received while the I/O service process 414A is being executed by the processor core 412A of the storage server 210A.

At step 1020, the storage server 210A deactivates the I/O service process 414A. In some implementations, step 1020 may be performed in the manner discussed with respect to the process 800 of FIG. 8. More particularly, to deactivate the I/O service process 414A, the I/O service process 414A may: (i) cause the storage servers 210B-C to stop transmitting internal I/O requests to the storage server 210A, (ii) pause the frontend component 510, (iii) pause the background component(s) 540, and (iv) pause the I/O provider(s) 550. As discussed above, in some in some implementations, these tasks may be performed in an order in which the I/O service process 414A is stopped from handling new I/O requests first (e.g., by causing the storage servers 210 to stop transmitting internal I/O requests and pausing the frontend component 510), after which other internal components of the I/O service process 414A are paused (e.g., the background component(s) 540 and the I/O provider(s) 550).

In some implementations, to stop the storage servers 210B-C from transmitting internal I/O requests to the I/O service process 414A, the storage server 210A may transmit to the storage servers 210B-C an instruction to this effect, in the manner discussed above with respect to step 810 of the process 800. Furthermore, in some implementations, the I/O service process 414A may stop the frontend component 510, the background component(s) 540, and the I/O provider(s) 550 by setting one or more synchronization barriers that are arranged to stop the frontend component 510, the background component(s) 540, and the I/O provider(s) 550 from carrying their functions after they have completed any tasks that are currently in progress.

At step 1030, the storage server 210A executes a context switch between the I/O service process 414A and the process 416A. The context switch may be performed in the manner discussed with respect to step 730 of the process 700.

At step 1040, the storage server 210A detects whether a second event is generated in the storage server 210A. If the second event is not generated, step 1040 is repeated. Otherwise, if the second event is generated, the process 1000 proceeds to step 1050. The second event may be the same or different from the first event, discussed with respect to step 1010, and it may include any suitable type of interrupt or other system signal. The second event may be received while the I/O service process 414A is being executed by the processor core 412A of the storage server 210A.

At step 1050, the storage server 210A reactivates the I/O service process 414A. In some implementations, step 1020 may be performed in the manner discussed with respect to the process 900 of FIG. 9. More particularly, to reactivate the I/O service process 414A, the I/O service process 414A may: (i) cause the storage servers 210B-C to resume transmitting internal I/O requests to the storage server 210A, (ii) resume the frontend component 510, (iii) resume the background component(s) 540, and (iv) resume the I/O provider(s) 550. As discussed above, in some in some implementations, these tasks may be performed in the reverse order of the tasks of step 1020, such that the I/O service process 414A is allowed to handle new I/O requests last (e.g., by causing the storage servers 210 to stop transmitting internal I/O requests and pausing the frontend component 510), after other internal components of the I/O service process 414A are resumed (e.g., the background component(s) 540 and the I/O provider(s) 550).

In some implementations, to cause the storage servers 210B-C to resume transmitting internal I/O requests to the I/O service process 414A, the storage server 210A may transmit to the storage servers 210B-C an instruction to this effect, in the manner discussed with respect to step 940 of the process 900. In some implementations, the I/O service process 414A may stop the frontend component 510, the background component(s) 540, and the I/O provider(s) 550, the storage server 210A by releasing the synchronization barriers discussed with respect to step 1020.

At step 1060, the storage server 210A executes a context switch between the process 416A and the I/O service process 414A. The context switch may be performed in the manner discussed with respect to step 750 of the process 700.

In some aspects, a similar effect to that of the processes 700 and 1000 may be achieved by configuring the processes 414A and 416A to execute for fixed time periods. For example, in such instances, each of the processes 414A and 416A may be configured to release the processor core 412A every 20 ms. However, this approach may unduly increase the latency at which I/O requests are handled by the storage server 210A and it may result in an unnecessary context-switch overhead. By contrast, as discussed above, the processes 700 and 1000 allows for the I/O service process 414A to be dynamically interrupted without having to configure the I/O service process 414A to relinquish the processor core 412A after a fixed time period. This arrangement permits the I/O service process 414A to be preempted only when necessarily, thereby reducing any negative effects that might arise out of the preemption by way of unnecessary system latency and/or increased context-switch overhead.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for dynamic multitasking in a storage system, the storage system including a first storage server configured to execute a first I/O service process and one or more second storage servers, the method comprising:
    detecting a first event for triggering a context switch;
    transmitting to each of the second storage servers an instruction to stop transmitting internal I/O requests to the first I/O service process, the instruction including an identifier corresponding to the first I/O service process, the identifier being arranged to distinguish the first I/O service process from other first I/O service processes that are executed by the first storage server concurrently with the first I/O service process;
    deactivating the first I/O service process by pausing a frontend of the first I/O service process, and pausing one or more I/O providers of the first I/O service process; and
    after the first I/O service process is deactivated, executing a first context switch between the first I/O service process and a second process, the first I/O service process and the second process being executed on a same processor core of the first storage server, and the first context switch causing the processor core to stop executing the first I/O service process and begin executing the second process.

2. The method of claim 1, wherein pausing the frontend of the first I/O service process includes transmitting to the first I/O service process an instruction, which when received by the first I/O service process causes the first I/O service process to set a synchronization barrier that is arranged to prevent the frontend of the first I/O service process from retrieving I/O requests from a pool of I/O requests after any on-going retrieval of I/O requests is completed.

3. The method of claim 1, wherein pausing the one or more I/O providers of the first I/O service process includes transmitting to the first I/O service process an instruction, which when received by the first I/O service process causes the first I/O service process to set a synchronization barrier that is arranged to prevent the I/O providers from beginning execution of new I/O tasks after completing any in-flight tasks that are being executed by the I/O providers.

4. The method of claim 1, wherein disabling the first I/O service process includes disabling one or more background components of the first I/O service process.

5. The method of claim 1, further comprising:
    detecting a second event for triggering a context switch;
    transmitting to each of the second storage servers an instruction to resume transmitting internal I/O requests to the first I/O service process, the instruction including an identifier corresponding to the first I/O service process;
    activating the first I/O service process by resuming a frontend of the first I/O service process, and resuming one or more I/O providers of the first I/O service process; and
    after the first I/O service process is activated, executing a second context switch between the second process and the first I/O service process, the second context switch causing the processor core to stop executing the second process and begin executing the first I/O service process.

6. The method of claim 1, wherein pausing the frontend of the first I/O service process includes transmitting to the first I/O service process an instruction, which when received by the first I/O service process causes the first I/O service process to release a synchronization barrier that is arranged to prevent the frontend of the first I/O service process from retrieving I/O requests from a pool of I/O requests after any on-going retrieval of I/O requests is completed.

7. The method of claim 1, wherein pausing the one or more I/O providers of the first I/O service process includes transmitting to the first I/O service process an instruction, which when received by the first I/O service process causes the first I/O service process to release a synchronization barrier that is arranged to prevent the I/O providers from beginning execution of new I/O tasks after completing any in-flight tasks that are being executed by the I/O providers.

8. An apparatus for use in a storage system, the storage system including a first storage server configured to execute a first I/O service process and one or more second storage servers, the apparatus comprising:
    a memory; and
    at least one processor operatively coupled to the memory, the at least one processor being configured to:
    detect a first event for triggering a context switch;
    transmit to each of the second storage servers an instruction to stop transmitting internal I/O requests to the first I/O service process, the instruction including an identifier corresponding to the first I/O service process, the identifier being arranged to distinguish the first I/O service process from other first I/O service processes that are executed by the first storage server concurrently with the first I/O service process;
    deactivate the first I/O service process by pausing a frontend of the first I/O service process, and pausing one or more I/O providers of the first I/O service process; and
    after the first I/O service process is deactivated, execute a first context switch between the first I/O service process and a second process, the first I/O service process and the second process being executed on a same processor core of the first storage server, and the first context switch causing the processor core to stop executing the first I/O service process and begin executing the second process.

9. The apparatus of claim 8, wherein pausing the frontend of the first I/O service process includes transmitting to the first I/O service process an instruction, which when received by the first I/O service process causes the first I/O service process to set a synchronization barrier that is arranged to prevent the frontend of the first I/O service process from retrieving I/O requests from a pool of I/O requests after any on-going retrieval of I/O requests is completed.

10. The apparatus of claim 8, wherein pausing the one or more I/O providers of the first I/O service process includes transmitting to the first I/O service process an instruction, which when received by the first I/O service process causes the first I/O service process to set a synchronization barrier that is arranged to prevent the I/O providers from beginning execution of new I/O tasks after completing any in-flight tasks that are being executed by the I/O providers.

11. The apparatus of claim 8, wherein disabling the first I/O service process includes disabling one or more background components of the first I/O service process.

12. The apparatus of claim 8, wherein the one or more processors are further configured to:
    detect a second event for triggering a context switch;
    transmit to each of the second storage servers an instruction to resume transmitting internal I/O requests to the first I/O service process, the instruction including an identifier corresponding to the first I/O service process;

activate the first I/O service process by resuming a frontend of the first I/O service process, and resuming one or more I/O providers of the first I/O service process; and after the first I/O service process is activated, execute a second context switch between the second process and the first I/O service process, the second context switch causing the processor core to stop executing the second process and begin executing the first I/O service process.

13. The apparatus of claim 8, wherein pausing the frontend of the first I/O service process includes transmitting to the first I/O service process an instruction, which when received by the first I/O service process causes the first I/O service process to release a synchronization barrier that is arranged to prevent the frontend of the first I/O service process from retrieving I/O requests from a pool of I/O requests after any on-going retrieval of I/O requests is completed.

14. The apparatus of claim 8, wherein pausing the one or more I/O providers of the first I/O service process includes transmitting to the first I/O service process an instruction, which when received by the first I/O service process causes the first I/O service process to release a synchronization barrier that is arranged to prevent the I/O providers from beginning execution of new I/O tasks after completing any in-flight tasks that are being executed by the I/O providers.

15. A non-transitory computer-readable medium storing one or more processor-executable instructions, which when executed by at least one processor cause the at least one processor to execute the operations of:

detecting a first event for triggering a context switch in a first storage server, the first server being configured to execute a first I/O service process for servicing I/O requests in a distributed storage system;

transmitting to each of a plurality of second storage servers that are part of the distributed storage system an instruction to stop transmitting internal I/O requests to the first I/O service process, the instruction including an identifier corresponding to the first I/O service process, the identifier being arranged to distinguish the first I/O service process from other first I/O service processes that are executed by the first storage server concurrently with the first I/O service process;

deactivating the first I/O service process by pausing a frontend of the first I/O service process, and pausing one or more I/O providers of the first I/O service process; and after the first I/O service process is deactivated, executing a first context switch between the first I/O service process and a second process, the first I/O service process and the second process being executed on a same processor core of the first storage server, and the first context switch causing the processor core to stop executing the first I/O service process and begin executing the second process.

16. The non-transitory computer-readable medium of claim 15, wherein pausing the frontend of the first I/O service process includes transmitting to the first I/O service process an instruction, which when received by the first I/O service process causes the first I/O service process to set a synchronization barrier that is arranged to prevent the frontend of the first I/O service process from retrieving I/O requests from a pool of I/O requests after any on-going retrieval of I/O requests is completed.

17. The non-transitory computer-readable medium of claim 15, wherein pausing the one or more I/O providers of the first I/O service process includes transmitting to the first I/O service process an instruction, which when received by the first I/O service process causes the first I/O service process to set a synchronization barrier that is arranged to prevent the I/O providers from beginning execution of new I/O tasks after completing any in-flight tasks that are being executed by the I/O providers.

18. The non-transitory computer-readable medium of claim 15, wherein the one or more processor-executable instructions are further configured to cause the at least one processor to perform the operations of:

detecting a second event for triggering a context switch;

transmitting to each of the second storage servers an instruction to resume transmitting internal I/O requests to the first I/O service process, the instruction including an identifier corresponding to the first I/O service process;

activating the first I/O service process by resuming a frontend of the first I/O service process, and resuming one or more I/O providers of the first I/O service process; and after the first I/O service process is activated, executing a second context switch between the second process and the first I/O service process, the second context switch causing the processor core to stop executing the second process and begin executing the first I/O service process.

19. The non-transitory computer-readable medium of claim 15, wherein pausing the frontend of the first I/O service process includes transmitting to the first I/O service process an instruction, which when received by the first I/O service process causes the first I/O service process to release a synchronization barrier that is arranged to prevent the frontend of the first I/O service process from retrieving I/O requests from a pool of I/O requests after any on-going retrieval of I/O requests is completed.

20. The non-transitory computer-readable medium of claim 15, wherein pausing the one or more I/O providers of the first I/O service process includes transmitting to the first I/O service process an instruction, which when received by the first I/O service process causes the first I/O service process to release a synchronization barrier that is arranged to prevent the I/O providers from beginning execution of new I/O tasks after completing any in-flight tasks that are being executed by the I/O providers.

* * * * *